United States Patent [19]
Tobin

[11] 3,890,326
[45] June 17, 1975

[54] BROMINATION WITH TRIFLUOROMETHYLBROMIDE
[75] Inventor: John H. Tobin, Hamden, Conn.
[73] Assignee: Olin Corporation, New Haven, Conn.
[22] Filed: Dec. 13, 1973
[21] Appl. No.: 424,394

[52] U.S. Cl. ...... 260/290 HL; 260/650 R; 260/653; 260/250 R; 260/250 A; 260/251 R; 260/294.9; 260/283 R; 260/283 CN; 260/651 R
[51] Int. Cl.² ............... C07D 213/26; C07D 213/61; C07C 17/12
[58] Field of Search ........ 260/290, 294.9, 465, 650, 260/651, 251, 250, 653

[56] References Cited
UNITED STATES PATENTS
3,632,807   1/1972   Maurer et al. ...................... 260/290

*Primary Examiner*—Harry I. Moatz
*Attorney, Agent, or Firm*—Robert L. Andersen

[57] ABSTRACT

A process for producing selected brominated aromatic or heteroaromatic compounds and fluoroform comprising reacting in the vapor phase a selected aromatic or nitrogen substituted heteroaromatic reactant and trifluoromethylbromide.

11 Claims, No Drawings

BROMINATION WITH TRIFLUOROMETHYLBROMIDE

BACKGROUND OF THE INVENTION

1. Field of Invention

The present invention relates to the vapor phase bromination of selected aromatic or heteroaromatic reactants, particularly those substituted with hydrogen, halogen, perhaloalkyl, or nitrile substituents or combinations thereof utilizing trifluoromethylbromide as the brominating agent.

2. Prior Art

Brominated aromatic compounds have traditionally been prepared by direct bromination of a suitable aromatic compound with or without heat in the presence of a catalyst such as ferric chloride or aluminum chloride. In such reactions bromine reacts with the aromatic compound to produce a brominated aromatic product and one mole of hydrogen bromide for each atom of bromine which is substituted on the ring. During these reactions some disubstitution takes place. It is known, however, that by controlling the amount of halogen and the time and temperature of the reaction one may control the degree of halogenation as desired. Thus a disubstituted aromatic compound will generally be the principal product of the reaction of two moles of bromine with one mole of a suitable aromatic compound. The orientation of the halogen substituents will depend on the nature and placement of substituents on the ring prior to bromination. Thus dibromobenzene produced from benzene and bromine will normally be a mixture of about 40–60% orthodibromobenzene and 40–60% paradibromobenzene with trace amounts of the meta isomer. These individual isomers are readily separated from the mixture if desired by known means such as distillation.

The major problem with such bromination processes is that the by-product of the reaction is hydrogen bromide. Hydrogen bromide is quite acidic and must be processed or handled in corrosion resistant equipment. Even with such equipment the useful life thereof is extremely short making this by-product extremely expensive to process or handle. Additionally, the by-product is generally not useful as such and accordingly must be converted to a useful product such as bromine, bromides or bromates or discarded. Conversion to a useful product requires additional treatment steps utilizing expensive equipment and again driving up handling costs. The other alternative, disposal, is also a problem. It involves a substantial amount of waste and requires special treatment in order to avoid the possibility of polluting streams or air in the process of disposing of the chemical.

One of the major purposes of the present invention is, therefore, to provide a process for brominating selected aromatic or heteroaromatic reactants wherein by-products are not corrosive and therefore do not create disposal problems or require the use of corrosion resistant equipment.

It is known in the art that perfluoroalkyl iodides react with benzene, halobenzenes, benzonitriles and trifluoromethyl benzene to form fluoroalkyl substituted aromatic compounds. See Tiers, J. Am. Chem. Soc., 82, 5513 (1960), Huyser, E. S., and Beddard, E., J. Org. Chem., 29 1588 (1964) and U.S. Pat. No. 3,271,441. One skilled in the art would expect that perfluoroalkyl bromides would also react with these compounds to produce perfluoroalkyl substituted aromatic compounds.

We have discovered, however, that trifluoromethyl bromide reacts with these compounds in the vapor phase to produce bromine substitution and that non-corrosive fluoroform, useful as a refrigerant, inert gas, as an intermediate in organic synthesis and as a direct coolant for infrared detector cells, is produced as the only significant by-product of the reaction.

The principal products of the reaction of the invention are well known to those skilled in the art and their use as chemical intermediates for the manufacture of innumerable aromatic compounds is also well known.

SUMMARY OF THE INVENTION

The present invention comprises a novel process for brominating selected aromatic or heteroaromatic reactants. In accordance with the invention, a selected aromatic, heteroaromatic, substituted aromatic or substituted heteroaromatic reactant is reacted in the vapor phase with trifluoromethylbromide. The molar ratios of trifluromethylbromide and reactant may be adjusted with respect to each other so that the degree of bromination may be controlled as in direct bromination processes. Temperature selection also plays an important role in determining the ultimate product.

DETAILED DESCRIPTION OF THE INVENTION

The selected reactants which may be brominated in accordance with the present invention are aromatic hydrocarbons, nitrogen containing heteroaromatic compounds and substituted derivatives thereof which do not contain substituents which are easily alkylated or brominated. Stated otherwise, a reactant useful in the present process must contain only stable substituents such as hydrogen, perhaloalkyl, halogen or nitrile. Reactants substituted with such reactive groups as hydroxyl, alkoxyl, nitro, amino, carboxyl, aldehyde, or partly substituted or unsubstituted alkyl or alkenyl may not advantageously be employed in the process since reaction with the substituent will occur.

The aromatic hydrocarbons useful in the invention are suitably aromatic compounds having 6–10 ring carbon atoms. Benzene or substituted benzenes are preferred but the reactant may also be an unsubstituted or appropriately substituted naphthalene.

Likewise the nitrogen containing heteroaromatic compound useful in the present invention has from 6–10 ring subatoms not more than 2 of which are nitrogen, the remainder being carbon. Thus, pyridines, pyrazines, pyrimidines, pyridazines and substituted derivatives thereof may be used in the reaction as long as they are not substituted with the reactive substituents described above. As with the aromatic hydrocarbon derivatives, the process may be utilized with more complex ring structures, for example quinolines, without departing from the spirit of the invention, but pyridines and appropriately substituted pyridines are preferred.

While the present process may be practiced utilizing any of the above-described reactants, it is preferred to use a compound having a single aromatic or heteroaromatic ring. The preferred aromatic reactant may, therefore, be benzene, halobenzenes, perhaloalkyl benzenes, benzonitrile, or a benzoid reactant having a mixture of halogen, perhaloalkyl or nitrile substituents on the aromatic ring. The preferred heteroaromatic compound is, likewise, pyridine, halopyridine, perhaloalkyl pyridines, nitrilopyridine or a pyridine nucleus having a mixture of halogen, perhaloalkyl or nitrile substituents on the heteroaromatic ring.

While suitable halogen containing reactants may contain one or more atoms of chlorine, fluorine or bromine or mixtures of such halogens, it is preferred to use such an aromatic reactant which is substituted with 1 to 3 halogen substituents, for example, chlorobenzene, bromobenzene, fluorobenzene, bromochlorobenzene, dibromochlorobenzene, difluorobenzene, fluorodichlorobenzene and comparably substituted pyridines. The effect of position of the various substituents on the ring is well known in the art and is also discussed briefly below.

Perhaloalkyl groups may also be present on the ring of the selected reactant. Generally short chain alkyl groups are utilized. Those having from 1–4 carbon atoms are suitable and those having 1–2 carbon atoms are preferred. Typical examples include $-CF_3$, $-C_2F_5$, $-CCl_3$ etc. While the most common halogens in such groups are fluorine and chlorine, bromine may also suitably be employed on the alkyl group, as may a combination of halogens. The principal criteria which must be observed is that all hydrogens on the alkyl chain must be replaced by a halogen group to avoid bromination or substitution on the side chain.

Nitriles or nitrile in combination with one or more halogen ring substituents or one or more perhaloalkyl substituents or combinations thereof may also be used in the reaction.

When an appropriate starting material has been selected, the reaction is carried out by introducing the selected reactant and trifluoromethylbromide into a vapor phase reactor maintained at a desired temperature and permitting the reaction to proceed in accordance with the equation

wherein $n$ represents the number of atoms of bromine substituted or to be substituted on the aromatic nucleus and AR represents the aromatic hydrocarbon heteroaromatic or substituted derivative thereof described above.

In conducting the reaction, the molar ratio of trifluoromethylbromide to the selected reactant will determine the degree of bromination which will take place provided temperature is sufficiently high to drive the reaction to completion. Each mole of trifluoromethylbromide makes one atoms of bromine available for attachment to the aromatic ring. Thus, if equimolar quantities of trifluoromethylbromide and reactant are utilized, mono bromination will occur. If two moles of trifluoromethylbromide are employed for each mole of reactant, substitution of two bromines will take place on the ring. If the molar ratio is 3:1 respectively, 3 atoms of bromine will be substituted on the ring if temperature permits completion of the reaction. Thus, the molar ratio of trifluoromethylbromide to reactant may be between 1:1 to at least 6:1 depending on the desired number of bromine atoms to be substituted on the ring. While the molar ratio may exceed 6:1, there is no advantage gained in doing so unless there are more than 6 positions available for bromine substitution, since this merely results in recovering unreacted trifluoromethylbromide and having to separate it from the reaction product. Likewise, there is no advantage gained in utilizing molar ratios of less than 1:1 since this will result in recovery of unreacted reactant and a corresponding reduction in yields.

The second critical factor in conducting the reaction is temperature. The reaction is run in the vapor phase and accordingly must be run at a temperature at least high enough to provide a substantial vapor pressure for the selected reactant. In general, it is required to run the reaction at a temperature substantially above the boiling point of such reactant and it is preferred that the temperature be at least 400°C. so that the reaction will proceed to completion as quickly as possible. If such minimum temperatures are employed commercially, feed rates may be maximized for comparable reactors without impairing yield.

Where one is attempting to substitute multiple bromine atoms on the reactant, the reaction temperature must be increased since each successive hydrogen becomes increasingly difficult to replace just as in prior art bromination procedures. Thus, if one wishes to replace five or six hydrogen atoms a much higher temperature must be employed than if one is attempting to replace only one or two hydrogens with bromine. The upper temperature limit will be the thermal decomposition temperature of the selected reactant or the product, whichever is lower. It is preferable, however, to maintain the reaction temperature at or below 1000°C. even if this means increasing residence time by decreasing feed rate. Accordingly, the preferred temperature range for the reaction is from 400°C. to 1000°C.

It is important to note that as bromination proceeds in accordance with the present invention, the factors which influence degree of bromination, position of substitution and isomeric mix in conventional bromination techniques are also operative here. Since these factors are well known in the art, the present discussion will only briefly outline the most salient points.

As mentioned above, the number of hydrogens replaced will depend (assuming adequate temperature) on the molar ratio of bromine to reactant and it is desirable, therefore, to maintain whole numbers in this ratio in order to get a desired product in as pure form as possible.

As with prior art bromination procedures the severity of the reaction must be increased as the number of hydrogens on the reactant is increased. Thus temperature can be utilized as a means for controlling the degree of bromination. Furthermore, the orientation of the substituent on the ring is influenced by the same steric factors as in prior art bromination techniques. Thus if benzene is employed as the reactant and the molar ratio of trifluoromethylbromide to benzene is 2, the principal product will be dibromobenzene and the product mix will be about 40–60% ortho isomer and from 40–60% para isomer with very little meta being formed.

Also as in the prior art where an isomeric mix is obtained as a result of steric factors or otherwise, known means such as distillation may be employed to separate one isomer from the other if it is desired to recover a particular isomer in substantially pure form.

Having thus fully described the process of the invention, the following examples are presented to further demonstrate the invention and to aid in the understanding thereof without limiting the scope thereof.

EXAMPLE I

A vapor phase reactor was constructed of glass and consisted of three sections. Section I was a series of valves permitting the introduction of one or two gasses and a liquid in measured quantities. Section II was a glass reactor tube 24 inches long and 1 inch in diameter and packed with an inert support. Section III is a trap system to trap product using a cold finger filled with ice water.

The reaction tube was heated to 550° to 570°C. under a nitrogen purge. The nitrogen was shut off and 17 g benzene and 22 g trifluoromethylbromide were introduced into the reaction tube over a period of 17 minutes.

Product collected from the trap and analyzed by vapor phase chromatography and infrared spectroscopy comprised: benzene 75.9 percent by weight, bromobenzene 22.2 percent by weight, miscellaneous brominated benzenes 1.8 percent by weight.

EXAMPLE II

The procedure of Example I was followed except that 15 g chlorobenzene and 25 g trifluoromethylbromide were introduced into the reactor over a period of 20 minutes. Yield was 69.4 percent by weight chlorobenzene, 22 percent by weight monobromochlorobenzene, and 8.6 percent by weight miscellaneous brominated chlorobenzenes.

EXAMPLE III

The reaction and analysis was carried out as described in Example I except that 21 g monofluorobenzene and 23 g trifluoromethylbromide were introduced over a period of 20 minutes to yield monofluorobenzene 45.1 percent by weight, monobromofluorobenzene 41.9 percent by weight, mixed brominated fluorobenzenes 13.0 percent by weight.

What is claimed is:

1. A process for preparing a brominated aromatic or heteroaromatic compound and fluoroform which comprises reacting a selected reactant with trifluoromethylbromide in the vapor phase and at a temperature of at least 400°C., said reactant being selected from the group consisting of aromatic hydrocarbons and heteroaromatic compounds having 6 to 10 ring atoms consisting of carbon and not more than 2 atoms of nitrogen, said aromatic reactant being substituted with hydrogen and further substituents selected from the group consisting of hydrogen, halogen, perhaloalkyl having 1 to 4 carbon atoms, nitrile and combinations of such further substituents.

2. The process of claim 1 in which the molar ratio of trifluoromethylbromide to said aromatic reactant is about equal to the number of bromine atoms to be substituted on the ring of said aromatic reactant.

3. Process of claim 1 wherein said aromatic reactant is selected from the group consisting of benzene, halobenzenes, perhaloalkylbenzene and benzonitrile.

4. Process of claim 1 wherein said aromatic reactant is selected from the group consisting of pyridine, halopyridine, perhaloalkyl pyridine, nitrilopyridine.

5. Process of claim 1 wherein said temperature is in the range of 400°C. to 1000°C.

6. Process of claim 1 wherein said aromatic reactant is a halobenzene selected from the group consisting of monohalobenzene, dihalobenzene and trihalobenzene.

7. The process of claim 6 in which said halobenzene is substituted with a member of the group consisting of chlorine, bromine and fluorine and mixtures of chlorine, bromine and fluorine.

8. The process of claim 1 in which said aromatic reactant is benzene.

9. The process of claim 1 in which said aromatic reactant is pyridine.

10. The process of claim 1 in which said perhaloalkylbenzene is trifluoromethylbenzene.

11. The process of claim 1 wherein said aromatic compound is benzonitrile.

* * * * *

PO-1050
(5/69)

UNITED STATES PATENT OFFICE
CERTIFICATE OF CORRECTION

Patent No. 3,890,326          Dated June 17, 1975

Inventor(s) John H. Tobin

It is certified that error appears in the above-identified patent and that said Letters Patent are hereby corrected as shown below:

Column 2, line 49, "subatoms" should read --atoms--.

Signed and Sealed this thirtieth Day of September 1975

[SEAL]

Attest:

RUTH C. MASON
Attesting Officer

C. MARSHALL DANN
Commissioner of Patents and Trademarks